United States Patent [19]

Fujieda et al.

[11] Patent Number: 5,150,111
[45] Date of Patent: Sep. 22, 1992

[54] APPARATUS FOR AND METHOD OF DETECTING AN ABNORMALITY IN A SIGNAL

[75] Inventors: Keishi Fujieda; Takeshi Kawamura, both of Osaka, Japan

[73] Assignee: Sumitomo Electric Industries, Ltd., Osaka, Japan

[21] Appl. No.: 790,137

[22] Filed: Nov. 7, 1991

Related U.S. Application Data

[63] Continuation of Ser. No. 431,557, Nov. 3, 1989, abandoned.

[30] Foreign Application Priority Data

Nov. 4, 1988 [JP] Japan ............... 63-279878

[51] Int. Cl.$^5$ ............................................. H04B 3/00
[52] U.S. Cl. .................... 340/825.3; 324/83 D; 340/658
[58] Field of Search .............. 340/146.2, 658, 825.3; 324/78 D, 78 R, 83 A, 83 D, 521, 522, 527; 328/120, 148; 371/71

[56] References Cited

U.S. PATENT DOCUMENTS

| | | | |
|---|---|---|---|
| 3,895,294 | 7/1975 | Vinding | 324/83 D |
| 4,006,348 | 2/1977 | Ochiai et al. | 340/658 |
| 4,700,129 | 10/1987 | Yoshizawa et al. | 324/83 D |
| 4,926,115 | 5/1990 | Tarleton et al. | 324/83 D |

FOREIGN PATENT DOCUMENTS

| | | | |
|---|---|---|---|
| 0006571 | 1/1977 | Japan | 340/658 |
| 0138475 | 7/1985 | Japan | 340/658 |
| 0163732 | 7/1986 | Japan | 324/83 D |
| 0233374 | 9/1989 | Japan | 324/83 D |
| 1476402 | 4/1987 | U.S.S.R. | 324/83 D |

OTHER PUBLICATIONS

Denki Kyodo Kenkyu, vol. 41, No. 4, pp. 40-45 and a partial translation of the pertinent parts.

*Primary Examiner*—Donald J. Yusko
*Assistant Examiner*—Dervis Magistre
*Attorney, Agent, or Firm*—W. G. Fasse; D. H. Kane, Jr.

[57] ABSTRACT

A method for detecting the presence or absence of an abnormality in a signal x having a frequency f from a signal source, is implemented by a circuit arrangement for deriving a now signal provided at the present time by the signal source, and for deriving a past signal at a point of time preceding the present time by an interval of time M/f where M is an integer. The circuit arrangement also detects an abnormality in the signal and/or the signal source compared to the new signal and to the past signal. The now signal $x_m$ is provided by the signal source at a point of. Another now-signal $x'_m$ is provided at a point of time preceding the now time t1 by t−1/4f. The signals Xm and xm are derived as a pair. A past signal $x_n$ corresponding to the signal $x_m$ and another past signal $x'_n$ corresponding to the signal $x'_m$ are also provided as a pair. The circuit arrangement also includes a calculating circuit which calculates $$\tan\theta = \frac{x'_m \cdot x_n - x_m \cdot x'_n}{x_m \cdot x_n + x'_m \cdot x'_n} \text{ for}$$

detecting the presence or absence of abnormality in the signal source and/or the signal depending on whether or not the phase difference $\theta$ between the now signal and the past signal is equal to 0.

22 Claims, 3 Drawing Sheets $T = 1/f$ $\Delta t = \dfrac{T}{4}$

PHASE DIFFERENCE OF
Xm AND Xn IS 90°

APPARATUS FOR AND METHOD OF DETECTING AN ABNORMALITY IN A SIGNAL

This application is a continuation of application Ser. No.: 07/431,557, Filed On: Nov. 3, 1989, now abandoned.

BACKGROUND OF THE INVENTION

This invention relates to a technique for detecting an abnormality in a signal, and more particularly to an apparatus for and a method of detecting such an abnormality in a signal and hence in a signal source by monitoring a phase or a level or both of a signal, and a level of a periodic signal having a fixed frequency generated by a signal source such as a power cable.

BACKGROUND INFORMATION

It is required for the maintenance of various apparatus to normally monitor a signal generated by a signal source for detecting the presence or absence of an abnormality in the signal to thereby also detect an abnormality in the signal source. Such monitoring and detection are performed in various fields. For example, by normally monitoring a conductor current flow through a power cable, a change in the current level and/or in the current phase which takes place upon the occurrence of an accident such as ground fault, shortcircuiting or the like of the power cable can be detected, and the accident can be dealt with rapidly. In particular, information of a level and a phase of a current when an accident has occurred, is detected by means of a plurality of cable heads or insulating junction boxes provided at predetermined positions. Such current level information and phase information from a plurality of detecting locations, are integrated at a signal information processing section to locate a point at which an accident has occurred. Thus, the accident can be dealt with promptly.

In a conventional signal detecting technique, it is necessary to use a reference signal both for detecting a phase of a signal and for detecting a signal level. For example, in the case of detection of a signal level, a signal is compared in its magnitude with a predetermined reference level, and the presence or absence of an abnormality in the signal, is detected from the result of such comparison.

In the case of phase detection, in order to derive the phase information, it is necessary to detect a zero crossing point of a signal. Thus, phase information is derived, for example, using a clock counter which is started in response to a zero crossing point for each period of a signal. Otherwise, detection signals at two points are individually converted into optical signals, which are transmitted to a point where they are compared in phase with each other.

However, in the case of the signal level detection, since comparison with a fixed reference level is involved, it is necessary to always hold the reference level to a predetermined fixed level with accuracy. Further, a determining operation for distinguishing between a surge component of a signal and an abnormal signal, is required. The distinguishing function requires a complicated construction which is a drawback.

Similarly, in the case of the apparatus for deriving phase information, a clock counter or the like is needed in a conventional construction. However, in the case of a device for monitoring a signal from a signal source at a plurality of points, there is a problem that inaccurate phase information may be derived due to a deviation in the phase of the clock signals at respective points. In order to cope with this, a circuit construction for correcting such deviation in the clock phase is needed. Accordingly, there is a problem that the circuit construction is complicated.

On the other hand, in the case where a phase detector is provided at each of a plurality of monitoring points and the phase information of such phase detectors is sent out to a monitoring station, for example, in accordance with a polling method, the times of transmitting the phase information from the individual monitoring points, are different from each other. Accordingly, phase information of a signal that has been measured at the same instant of time, cannot be sent out. Consequently, a time point at which an accident has happened, cannot be ascertained in accordance with the phase information available when an accident occurs.

Further, in the case where detection signals at two points are converted into optical signals or the like and transmitted to another point at which they are directly compared in phase with each other, there may be no trouble if an optical cable forming a signal transmission line, is provided in a juxtaposed relationship with a measurement cable installed together with a power cable in a duct. Otherwise, a signal transmission line cannot be provided readily. Consequently, it is a drawback that the comparison of information from two points cannot be achieved with a simple construction.

As described so far, in the conventional signal abnormality detecting techniques, since a reference signal is employed for the phase detection and for the level detection method, there is a problem, in addition to the problem of obtaining inaccurate information, that the apparatus construction is complicated because a device for generating a reference signal or a device for correcting a reference signal is required.

Further, in a conventional device the same input path must be used for a signal which is provided in a normal condition and for a signal which is provided when an abnormality takes place. Accordingly, in case the signal level in a normal condition is significantly different from the signal level in an abnormal condition, in order to take both such signal levels into the device to perform the required procesing and signal evaluation, it is necessary to set the maximum input signal level to, for example, the maximum level of the abnormal signal. Consequently, the S/N ratio upon processing of a signal which is low in level such as, for example, a normal signal, deteriorates. Hence, it is a problem that the detection of a normal signal level or of a change in phase level, cannot be achieved with accuracy.

SUMMARY OF THE INVENTION

It is an object of the present invention to provide an apparatus for and a method of detecting abnormality in a signal wherein, with eliminating the drawbacks of the conventional signal abnormality detecting techniques described above, there is no necessity for using a reference signal and a signal can be taken in and processed at a high S/N ratio for both a normal signal and an abnormal signal.

According to one aspect of the present invention, the present method of detecting an abnormality in a signal generated by a signal source, comprises the steps of deriving a now signal corresponding to a signal generated by the signal source at the time of deriving said now signal, deriving a past signal corresponding to a signal generated by the signal source at a time preceding the now signal by a predetermined interval of time, comparing the now signal with the past signal, and determining the presence or absence of an abnormality in the signal from the signal source in accordance with a result of such a comparison.

According to another aspect of the present invention, there is provided an apparatus for detecting an abnormality in a signal generated by a signal source, said apparatus comprising means for presently deriving a now signal corresponding to a signal generated by the signal source at the time of deriving said now signal, means for deriving a past signal corresponding to a signal generated by the signal source at a point of time in the past preceding the now signal by a predetermined interval of time, and means for comparing the now signal with the past signal to determine the presence or absence of an abnormality in the signal from the signal source.

Preferably, a path for passing the signal unmodified, as received from the signal source therethrough and another path for passing the signal from the signal source therethrough after level conversion are provided as paths for receiving the signal from the signal source.

With the method and apparatus described above, since a past signal and a now signal from the signal source are compared with each other in order to detect an abnormality in the signal from the signal source, there is no need for using a reference signal for comparison, and accordingly, detection of an abnormality in the signal from the signal source can be achieved readily and accurately in a simple circuit arrangement.

Further, where two separate paths having different processing levels are provided as signal taking-in paths, even if the signal levels are significantly different in a normal condition and in an abnormal condition, processing of a signal can be achieved using circuit systems having signal processing ranges suitable for the individual signal levels. Consequently, the S/N ratio in the low signal level processing system can be improved.

The above and other objects, features and advantages of the present invention will become apparent from the following description, taken in conjunction with the accompanying drawings in which like parts are denoted by like reference characters all through the figures.

DESCRIPTION OF THE PREFERRED EMBODIMENTS

Figure 1:
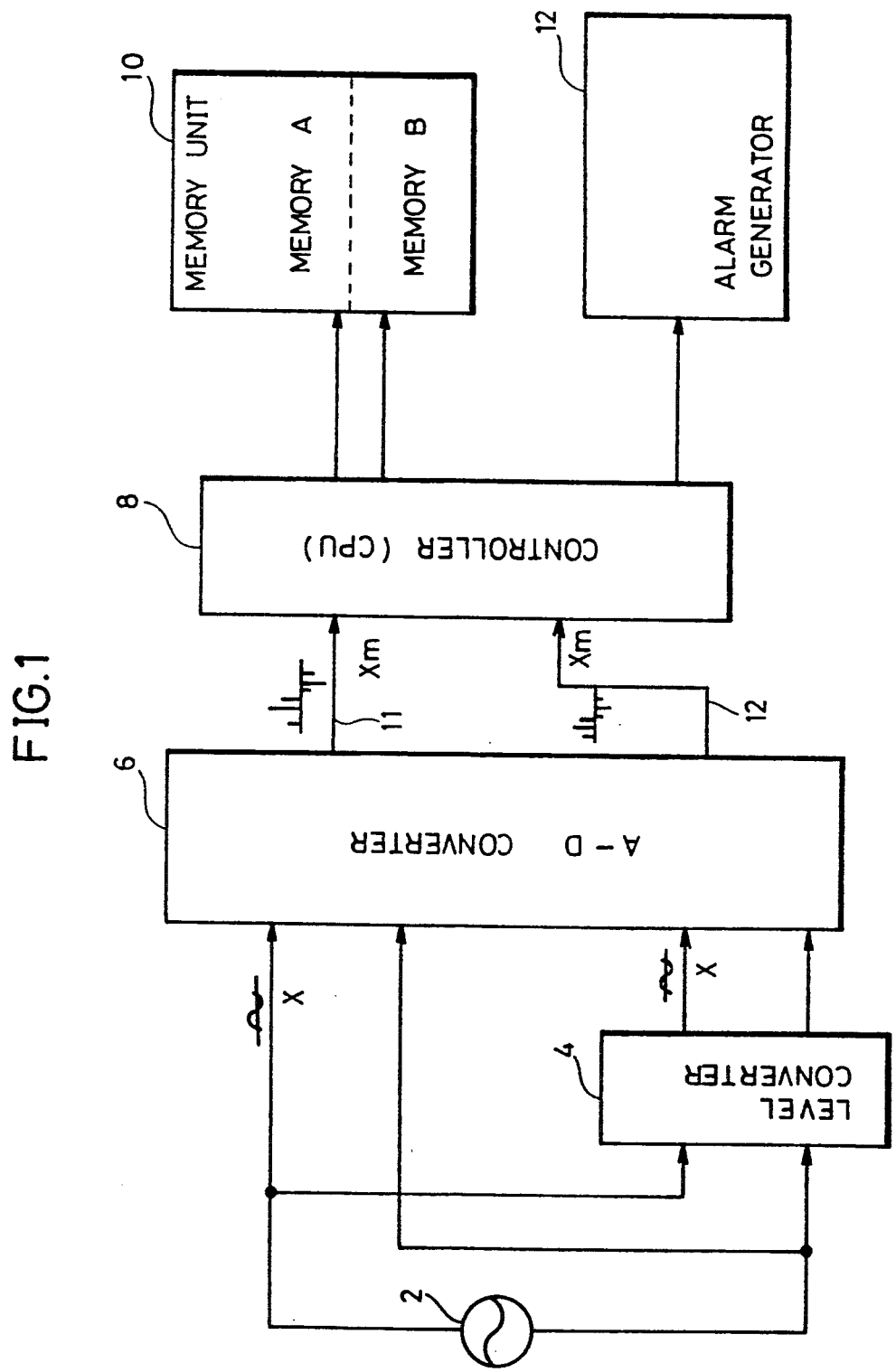
FIG. 1 is a block diagram showing a general construction of a signal abnormality detecting circuit arrangement according to an embodiment of the present invention.

Before describing an embodiment of the present invention, a conventional abnormality detecting method on which the embodiment of the present invention is based, will be explained.

A method of detecting a difference in phase of an electric current and a difference in the phase of a voltage, is disclosed, for example, in Denki Kyodo Kenkyu, Vol. 41, No. 4. This known method will first be described as follows.

According to Denki Kyodo Kenkyu a difference in voltage and a difference in current is developed where a voltage signal $$v = V \cos \omega t$$

and a current signal $$i = I \cos (\omega t + \theta)$$

are sampled simultaneously at angular intervals of 30 degrees, that is, they are sampled 12 times for one period. In the known method, at first, sampling points at which the difference in phase angle is 90 degrees ($=\pi/2$) are extracted from a voltage and from a current such that, where the instantaneous values of the current and the voltage are represented by $v_m$ and $i_m$ respectively, the following equations may be met.

$$v_m = V\cos\{(m\pi/6) - \alpha\}$$

$$i_m = I\cos\{(m\pi/6) - \alpha + \theta\}$$

$$v_{m-3} = V\cos\{(m - 3)\pi/6 - \alpha\}$$
$$= V\sin\{(m\pi/6) - \alpha\}$$

$$i_{m-3} = I\cos\{(m - 3)\pi/6 - \alpha + \theta\}$$
$$= I\sin(m\pi/6 - \alpha + \theta)$$

Then, for the individual instantaneous values, $$v_m \cdot i_m + v_{m-3} \cdot i_{m-3} = V \cdot I \cos \theta$$

$$v_{m-3} \cdot i_m - v_m \cdot i_{m-3} = V \cdot I \sin \theta$$

are calculated, and a phase difference $\theta$ between the voltage and the current is calculated from the equations above. In the respective known circuit arrangement, a current signal and a voltage signal are used to detect a phase difference between the two signals.

The present invention provides a method which is an improvement to the known method described above and detects a phase difference between a now signal and a past signal obtained in the past prior to the now signal. Both, the now signal and the past signal are derived from the same signal based on the equations given above.

In particular, according to the present invention, it is assumed that a signal x from a signal source is a sine wave (or a cosine wave), and sample values given by the following equations are used as present or now values and as past values of the signal x:

$$x_m = A \cos (m\omega t) \quad \text{(present now)}$$

$$x_n = B \cos (n\omega t + \theta) \quad \text{(past)}$$

where m and n are integers, and $\omega$ is given by $$\omega = 2\pi/T$$

where T is the period.

Further, the phase difference $\Delta t$ between $x_m$ and $x'_m$ and between $x_n$ and $x'_n$ is selected so that it is 90 degrees (or $\pi/2$), $\Delta t = T/4f$. In this instance, if sampling past values $x_n$ and $x'_n$ preceding now values by an integral number of times a frequency $f$ ($f=\omega/2\pi$), and now values $x_m$ and $x'_m$ are, used then $$x_m \cdot x_n + x'_m \cdot x'_n = AB \cos \theta \text{ and}$$

$$x'_m \cdot x_n - x_m \cdot x'_n = AB \sin \theta$$

are obtained from the four sampled values. From the two equations, the following expression is obtained.

$$\tan\theta = \frac{x'_m x_n - x_m \cdot x'_n}{x_m \cdot x_n + x'_m \cdot x'_n} \quad (1)$$

In accordance with equation (1), the presence or absence of a deviation in the phase relationship can be determined from the present or now signals and from the past signals. More specifically, when the signal x from the signal source is normal, the phase difference $\theta$ will be zero since the past sampling signal preceding by an integral number of times, the frequency, and the now signal (sampling signal) have the same phase, thereby indicating a normal signal. On the other hand, if the signal x from the signal source is in an abnormal condition, there is some difference in the phase between the past signal preceding by an integral number of times, the frequency, and the present or now signal. Accordingly, the phase difference $\theta$ is not equal to zero. Thus, monitoring the phase difference $\theta$ makes it possible to determine the presence or absence of an abnormality in a signal from a signal source.

If the frequency of the signal from the electric signal source is 60 Hz and is sampled at an electrical angle of 30 degrees, and if it is assumed that a storage device is employed which can periodically store therein data obtained by analog to digital conversion of the signal x from the signal source for 256 bytes, then one cycle of the signal from the signal source includes up to 12 samples, and it is possible for the storage device to store therein data for 21 waves (cycles) of the signal x.

Accordingly, where the sampling angle is 30 degrees, if a signal $x_m$ and another signal $x'_m$ preceding by 90 degrees in phase the signal $x_m$ are used as present or now signals, where signals $x_n$ and $x'_n$ corresponding to signals at points of time preceding by an integral number of times are used as past signals, and where said frequency is used with said past signals and said present signals perform said calculation as described above, then the presence or absence of an abnormality in the signal from the signal source can be determined.

A general construction of a signal abnormality detecting circuit arrangement according to an embodiment of the present invention is shown in FIG. 1. Referring to FIG. 1, the signal abnormality detecting device includes a level converter 4 for receiving an analog signal x from a signal source 2, converting the signal level and outputting a level converted signal, an analog to digital converter (A–D converter) 6 for receiving a signal from the level converter 4 and another signal from the signal source 2 and converting the received signals into digital signals, a control unit 8 for receiving a digital signal from the A–D converter 6 to write the received digital signal into a memory unit 10, reading out necessary data from the memory unit 10 and executing a predetermined signal processing to detect the presence or absence of an abnormality in the signal from the signal source 2. The circuit further includes an alarm generator 12 responsive to a detected abnormality representing signal from the control unit 8 for providing a notification in the form of sound or visible information, e.g., by means of a lamp or the like.

The level converter 4 reduces a signal transmitted thereto at a predetermined rate, in case the level of the signal received when abnormality takes place, is considerably higher than the signal level in a normal condition.

The A–D converter 6 samples a signal x transmitted thereto with a sampling frequency F higher than the frequency f of the signal x and outputs the thus sampled signal x.

The control unit 8 receives digital signals transmitted thereto over signal lines 11 and 12 from the A–D converter 6 and writes the received digital signals into a predetermined area of the memory unit 10. Further, the control unit 8 reads out predetermined digital signal values from the memory unit 10 and performs the necessary calculation.

The memory unit 10 includes a memory area A for storing therein a signal which is transmitted thereto over the signal line 11 and hence has not undergone a level conversion (signal in a normal condition), and another memory area B for storing therein a digital signal for detecting the occurrence of an abnormality which is transmitted thereto over the signal line 12. The memory unit 10 may be, for example, a random access memory having a sufficient capacity to store data of the signal x for a predetermined number of cycles. In this instance, in case the signal x has a frequency of for example, 60 Hz and the sampling frequency F is 720 ($60 \times 12$) Hz, one cycle contains twelve sample values. Where an output of the A–D converter 6 is represented by 8 bits and a storage device having a capacity of 256 bytes is employed, then the digital value information (sample values) for 21 waveforms (cycles) can be stored in the memory unit. In this instance, since the memory unit 10 is so constructed that signals which have not undergone a level conversion and signals which have undergone level conversion are stored independently of and separately from each other, it generally requires a capacity of at least 512 bytes.

The control unit 8 may be constructed using, for example, a commercially available CPU (central processing unit) and is adapted to write a signal transmitted thereto from the A–D converter 6, into the memory unit 10 and read out necessary data from the memory unit 10 to perform the necessary calculation. In this instance, where the sampling frequency is 720 Hz as described above, and since the speed of operation of the CPU is much higher (for example, 4 MHz, 12 MHz or the like), it is possible for the CPU to execute writing and readout of data and a calculation before a next sample signal is received after a sample signal has been received.

Figure 2:
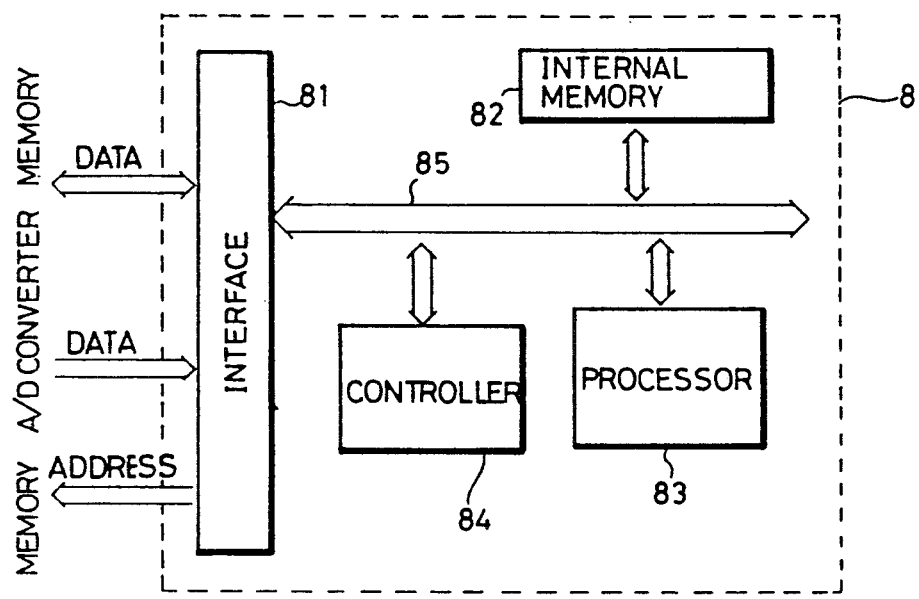
FIG. 2 is a block diagram schematically showing an exemplary construction of a controlling circuit used in the apparatus of FIG. 1.

FIG. 2 is a block diagram showing an exemplary construction of the control unit 8 shown in FIG. 1 wherein the control unit 8 is a CPU. Referring to FIG. 2, the control unit 8 comprises an interface 81 which executes the transmission and reception of data to and from the memory unit 10, the reception of data from the A–D converter 6, and the transmission of an address to designate a storing position or a readout position for data in the memory unit 10. The control unit 8 further includes an internal memory 82 for temporarily storing therein data received by way of the interface 81, a processor 83 for reading out data stored in the internal memory 82, for executing a predetermined calculation, and for then outputting a result of such calculation. The control unit 8 further includes a controller 84 for generating controlling signals for writing and readout of data, for generating an address and for causing a processing operation by the processor 83. The transmission of data within the control unit 8 is performed by an internal bus 85. The operation of the signal abnormality detecting apparatus of the embodiment of the present invention will now be described with reference to FIGS. 1 and 2.

Figure 3:
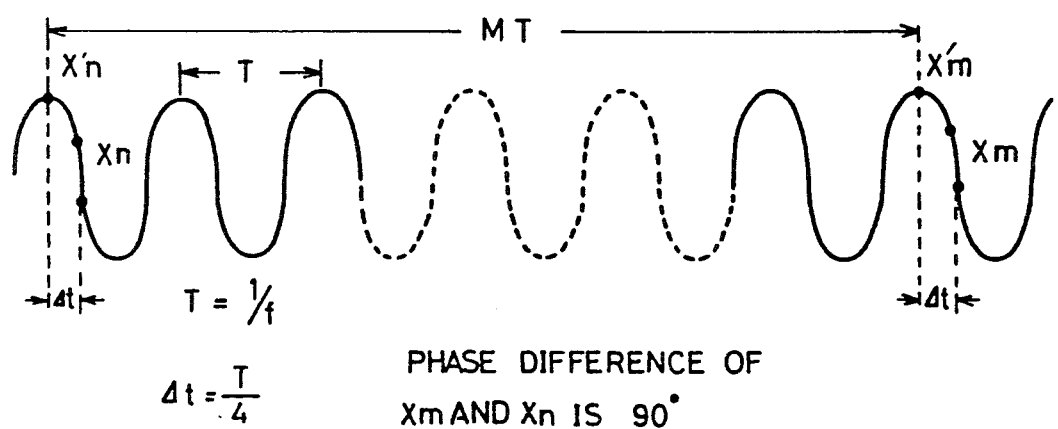
FIG. 3 is a diagram illustrating the principle of detecting a signal abnormality according to the method of the present invention.

It is assumed now that the control unit 8 is monitoring the phase of a signal from the signal source as shown in FIG. 3 in accordance with the equation (1) given hereinabove using sample values of the signal. The level converter 4 reduces the level of an analog signal x received from the signal source 2 and outputs the reduced analog signal to the A-D converter 6. The A-D converter 6 converts the analog signals received from the signal source 2 and from the level converter 4 into digital signals of, for example, 8 bits each and delivers the thus converted signals to the control unit 8. The control unit 8 enters the signals received from the A-D converter 6 into the memory unit 10. In this instance, the data may be simply written into the memory unit 10 in an order in which they are transmitted to the memory unit 10 by incrementing sequentially the address thereof. An address indication of a data storage position is generated under the control 84 shown in FIG. 2.

In the memory unit 10, digital data corresponding to signals which have not undergone a level conversion, are stored in the memory area A while digital signals which have undergone a level conversion and have been transmitted thereto through the signal line 12, are stored in the memory area B. Writing of data into the memory unit 10 is executed for a predetermined number of cycles, and at a point of time when data are stored for the predetermined cycles into the memory unit 10, the control unit 8 reads out $X_m$ and $X'_m$ as present or now signals and $X_n$ and $X'_n$ as past signals from the memory unit 10 and stores these now signals and past signals into the internal memory 82. In this instance, since the cycle at which a signal is received from the A-D converter 6, that is, the sampling cycle, is larger, as compared to the speed of operation of the control unit 8, the control unit 8 can execute the reading of data between successive entries of data into the memory unit 10.

After the four digital data are stored into the internal memory 82 of the control unit 8, they are transmitted to the processor 83 under the control of the controller 84. The processor 83 executes, upon reception of the now signals $X_m$ and $X'_m$ and of the past signals $X_n$ and $X'_n$, calculations of:

$$X_m \cdot X_n + X'_m \cdot X'_n \text{ and}$$

$$X'_m \cdot X_n - X_m \cdot X'_n$$

and then executes a division of respective results of the calculations to detect a difference in phase between the now signals and the past signals.

In case the calculated phase difference $\theta$ is 0, then there is no phase difference between the now signals and the past signals preceding by a time MT (where M is an integer, and T is a period of the signal x. Therefore the signal source 2 is operating in a normal condition. It is to be noted that, in the equation given hereinabove, sample signals which present a phase difference of 90 degrees as shown, as an example, in FIG. 3, are selected in pairs as now signals $X_m$ and $X'_m$ while signals $X_n$ and $X'_n$ preceding the now signals by the time MT, are selected in pairs as past signals. Where the memory unit 10 is constituted such that sample data, digital data, for one cycle may be stored in a row, such selection can be attained by selecting signals preceding by MT rows, the row for the now signals, whereby the construction of the respective circuit arrangement can be attained readily.

Further, upon such calculating operation, in case digital data received through the signal line 12 from the A-D converter 6, are lower than a predetermined value, the control unit 8 executes the calculation described hereinabove only using the memory area A in which signals in a normal condition of operation, that is, signals received through the signal line 11 are stored. This is because, when the signal source 2 is operating in a normal condition, the level of the signals received through the signal line 12 is low since the input signal undergoes a level conversion by the level converter 4. Accordingly data stored in the memory area B should be treated as invalid data.

In case an abnormality takes place in the signal x of the signal source 2, so that the level of the signal x becomes high, the signal level of the signal on line 12 becomes also high which the signal level of the signal on line 11 becomes even higher. In this instance, the control unit 8 detects the magnitude of the two kinds of data, and when data received over the signal line 12 reach a level higher than a predetermined level, the control unit 8 determines data in the memory area B as now signals and reads out data from the memory area A as corresponding past signals to execute the calculation processing described hereinabove. Such detection of a signal level can be achieved where the outputs of the A-D converter 6 are, for example, 8 bit data and accordingly the data transmitted to the control unit 8 are 16 bit data, by detecting and monitoring the levels or values of the upper 8 bits and the lower 8 bits of the 16 bit data transmitted to the control unit 8, a signal change in a data readout path and in a data writing path, as described hereinabove, can be achieved readily by said signal level detection.

An abnormal signal condition will now be described where the signal x from the signal source 2 signifies such an abnormal condition so that the level of the signal x becomes considerably high. In this instance, the level of the signal x from the level converter 4 assumes a detectable level, and the signal x is transmitted to the control unit 8 by way of the A-D converter 6. On the other hand, the level of a signal transmitted from the A-D converter 6 to the controller 6 through the signal line 11 becomes considerably higher than the level in a normal condition. The control unit 8 detects such change in level and enters the signals received through the signal line 12 into the memory area B of the memory unit 10. The control unit 8 then reads out two data of digital information as now signals from the memory area B of the memory unit 10 and further reads out two digital data as past signals from corresponding positions of the memory area A of the memory unit 10. The control unit 8 executes the calculating processing described hereinabove in phase between the now signals and the past signals. In case the signal x is in an abnormal condition, the phase difference $\theta$ between the past signals and the present signals is not equal to 0, and accordingly, the control unit 8 determines that an abnormality has taken place in the signal x and outputs a signal to the alarm generator 14 to generate an alarm signal, The alarm generator 14 provides a notification of the abnormal condition in the form of a sound signal or a visible light signal in response to the abnormality detection signal received.

Further, if the memory unit 10 described above is constructed such that an area thereof in which data which have undergone a level conversion are to be stored, data area B, and another area in which data which have not undergone a level conversion are to be stored memory area A, are given by even-numbered addresses and odd-numbered addresses, respectively, then a readout of data upon the occurrence of an abnormal condition and a readout of corresponding to past data can be executed readily.

Since a signal from the signal source 2 can be monitored using present signals and past signals and an abnormality in the signal from the signal source 2 can be detected from a change in the phase of the signal in such a manner as described above, an abnormality of the signal x can be detected with certainty with a simple circuit arrangement or construction without the necessity of using a reference signal at all.

It is to be noted that, while in the construction described above only a phase of a signal is monitored, if the levels of a now signal and a past signal are further compared with each other, then presence or absence of an abnormality in a signal can be detected with a higher degree of accuracy, than was possible heretofore having regard to various of measurement.

In the above embodiment, it is described that a changeover of a readout path upon detection of an abnormality in a signal, is achieved by detecting of a signal level. This signal detection is also possible in an alternative embodiment wherein only the levels of signals on the signal lines 11 and 12 are compared with each other. If the signal level on the signal line 12 is lower than on the signal line 11, it is determined that the signal x is in a normal condition and only the memory area A of the memory unit 10 is accessed. However in the first mentioned embodiment, both of the memory areas B and A are accessed.

Further, the three calculations including the calculation for detection of a phase difference involving a readout of now signals and past signals from the memory area A, the calculation for detecting of a phase difference from data of the memory area B and data of the memory area A and the calculation for detecting a phase difference from now and past signals of the memory area B, may be executed in parallel fashion.

Further, a changeover of the writing/readout paths of digital data in the signal abnormality detecting apparatus having such a construction as described above, may be executed otherwise by comparing a signal level on the signal line 12 and a predetermined digital value. Since they are both digital data, simple comparison of digital values will allow detection which one is greater than the other.

Further, in the embodiment described above, a signal from the signal source 2 is converted into a digital value and a change in phase of the signal from the signal source 2 is monitored based on the thus digitally converted sample values. However, similar effects to those of the embodiment described above, can be achieved if the construction is replaced by a circuit arrangement as shown in FIG. 4.

Figure 4:
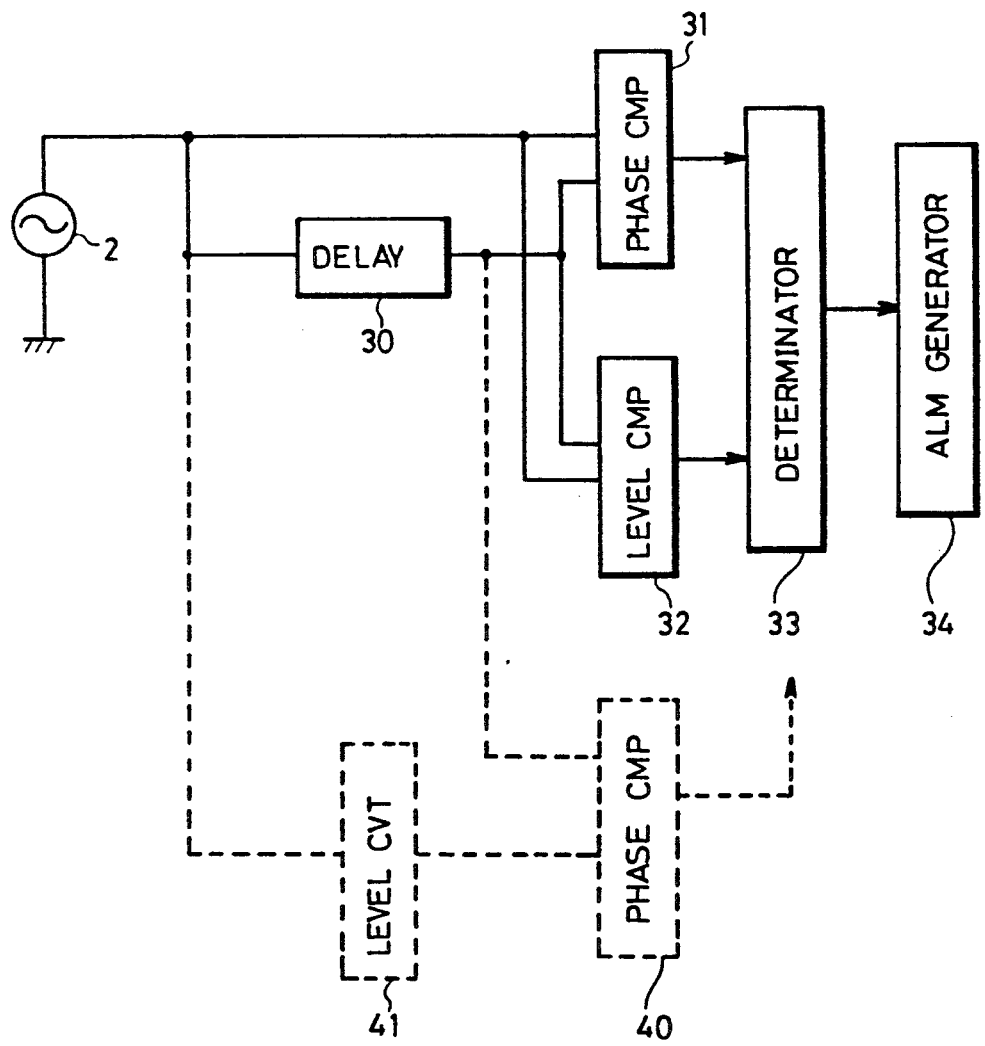
FIG. 4 is a block diagram showing the general construction of a signal abnormality detecting circuit according to another embodiment of the present invention.

Referring to FIG. 4, there is shown a signal abnormality detecting apparatus wherein a change in phase of a signal is monitored in the form of an analog signal. The signal abnormality detecting apparatus shown includes a delay device 30 for outputting a signal from a signal source 2 in a delayed relationship by a predetermined interval of time, a phase comparator 31 for receiving an output from the delay device 30, and a signal from the signal source 2 for comparing the phases of these signals with each other. The circuit of FIG. 4 further includes a level comparator 32 for comparing levels of a signal from the signal source 2 and another signal from the delay device 30 with each other, a determinator circuit 33 for determining the presence or absence of an abnormality in the signal from the signal source 2 in response to signals from the phase comparator 31 and the level comparator 32, and an alarm generator 34 for generating an alarm in response to an abnormality detection signal from the determinator 33. Similar effects to those of the signal abnormality detecting apparatus of the first embodiment hereinabove, can be attained with the signal abnormality detecting apparatus of the just described further embodiment.

In the embodiment of FIG. 4, the phase comparator 31 can be constructed readily using an ordinary analog phase comparator, and if the width of an output pulse of a two-input AND gate or exclusive OR gate, for example, is monitored, then the presence or absence of a deviation in phase and a degree of such deviation can be monitored.

The level comparator 32 can be constructed readily using an ordinary analog comparator such as an operational amplifier.

The determinator 33 monitors an output of the phase comparator 31 for determining that an abnormality has occurred when the output indicates that there is some difference in the phase, and then activates the alarm generator 34.

The construction details of the determinator 33 may differ depending upon the construction of the phase comparator 31, when the phase comparator 31 develops, for example, a signal having a pulse width which increases in proportion to the phase difference. Normally, the determinator 33 can be realized by an AND gate having an input which directly receives an output of the phase comparator 31 and another input which receives an output of the comparator 31 by way of a delay circuit. The delay time of the delay circuit provides an abnormality occurrence criterion. If the output of the AND gates presents a high level ("H"), then this means that there is a phase difference greater than a predetermined value, that is, some abnormality has occurred.

In order to make the detecting operation of the phase comparator 31 more accurate in the circuit arrangement of FIG. 4 described above, in case the signal level upon occurrence of an abnormality is significantly higher than the signal level in a normal condition, an additional phase comparator 40 may be provided which receives a signal from the signal source 2 by way of an additional level converter 41 and also receives an output of the delay circuit 30 as indicated by the broken lines in FIG. 4. If the level converter 41 is provided at an input portion of the phase comparator 40 at which a signal from the signal source 2 is received, then even if the level of the signal from the signal source 2 rises significantly when an abnormality occurs, such high level can be reduced by the level converter 41 so that it may conform to the dynamic range of the phase comparator 40. Thus, a phase comparison in an abnormal condition can be performed with a higher degree of accuracy and hence the presence or absence of a change in phase can be detected with a higher degree of accuracy.

The delay time of the delay circuit 30 may be an interval of time equal to an integral number of times the cycle of the signal from the signal source 2 and may be set to a suitable value. The degree of level conversion or the signal level reduction rate to be performed by the level converter 41 is determined suitably in accordance with the circuit construction employed.

The determinator 33 monitors output signals from both phase comparators 31 and 40.

Further, the signal abnormality detecting apparatus of the embodiment described above is constituted such that a change in phase between the now signal and the past signal is detected and, even when such phase change occurs only once, it is determined that an abnormality has taken place. However, it may be modified such that, when such deviation in phase change continues for N successive times, it is determined that an abnormality has taken place in the signal from the signal source 2.

Such construction may be employed that, in case an analog signal processing is executed in, for example, the signal abnormality detecting apparatus of FIG. 4, a timer may be used if the period of time wherein an abnormality is detected in an output signal from the phase comparator 31 or 40 has continued for a duration longer than a predetermined length of time. In that case it is determined that abnormality has taken place in the signal from the signal source 2.

On the other hand, in the case of a signal abnormality detecting apparatus of the construction shown in FIG. 1, a counter circuit may be provided either within the control unit 8 or between the control unit 8 and the alarm generator 14 such that it may count an abnormality detection signal (phase difference presence detection signal) and, when the count value reaches a predetermined value (N), it may activate the alarm generator 14. Since the counter circuit is required to generate a signal for activating the alarm generator only when an abnormality detection signal is provided continuously for N times, it is reset when the count value does not reach the count N within a predetermined period of time. The reset signal can be obtained readily by means of a timer which counts a clock signal which provides a sampling timing for the A-D converter 6, or a frequency-divided signal of the clock signal, to generate an activating signal for each predetermined count value. In this instance, either a latch circuit for latching an alarm generator activating signal or a circuit for invalidating a reset signal in response to such activating signal, is provided for generating alarm signals continuously even if the counter circuit is reset during generation of the alarm generator activating signal.

Further, in the signal abnormality detecting circuit of FIG. 4, a changeover of the determination made in the determinator 33, may be carried out in response to an output of the level comparator 32.

Further, similar effects to those of the signal abnormality detecting circuit of FIG. 4 can be attained even if the apparatus is modified such that a sample and hold circuit for sampling and holding an analog signal is provided at an input portion of each component circuit.

In case the object to be monitored by the signal abnormality detecting apparatus described above, is a conductor current of a power cable, if a branch power source from the power cable is used as an operation power source, then it is not necessary to provide another dedicated operation power supply device and an operation power source can be obtained readily.

As described above the present method and circuit arrangement do not require employment of a reference signal for determining the presence or absence of abnormality in a signal from a signal source, whereby the present apparatus is quite simpler in its construction compared to the prior art. Besides, various problems involved in the generation of a reference signal such as correction of a phase deviation of the reference signal and the respective phase correction circuit have been eliminated. Therefore, the presence or absence of a abnormality in a signal can be detected with a higher degree of accuracy than heretofore.

Further, since two processing systems for a signal which has been processed by a level converter and for another signal which has not been processed by the level converter, are provided for the detection of an abnormality in the signal from the signal source, even when the signal levels in a normal condition and in an abnormal condition are significantly different from each other, the dynamic range for signal even of a signal of a small level such as a signal in a normal condition, can be set to an optimum value. Thus, the S/N ratio in the processing of a normal signal having a small signal level, can be improved, and a signal can be monitored with a higher degree of accuracy.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of detecting an abnormality in a single analog signal generated by a signal source, comprising the following steps:
   (a) deriving a digital now-signal as a first digital signal level from said single analog signal presently provided by said signal source;
   (b) deriving a digital past signal as a second digital signal level from said single analog signal provided by said signal source prior to said digital now-signal so that a predetermined time interval exists between said digital now-signal and said digital past signal;
   (c) comparing said digital now-signal level and said digital past signal level itself with each other; and
   (d) determining the presence or absence of an abnormality in said single analog signal from said signal source in accordance with a result of said comparing of said digital now-signal level with said digital past signal level.

2. The method of claim 1, wherein said single signal from said signal source is a periodic signal having a predetermined frequency, and wherein at least one of the levels and one of the phases of the digital now-signal and the digital past signal are compared with each other in said comparing step.

3. The method of claim 1, wherein said single signal from said signal source is a periodic signal having a predetermined frequency, and wherein said step of deriving a digital past signal includes a step of outputting said digital past signal from a memory, wherein said digital past signal has been stored for an interval of time equal to an integral number times a predetermined period of said periodic signal.

4. The method of claim 1, wherein said step of deriving a digital now-signal and said step of deriving a digital past signal both include the step of passing said single signal unchanged out of said signal source, and a step of converting the signal level of said signal source prior to outputting a level converted signal from said signal source.

5. The method of claim 1, wherein the signal generated by said signal source is a periodic signal having a predetermined frequency f: wherein said step of deriving a first digital now-signal includes a first sub-step of deriving said digital now-signal corresponding to a signal generated by said signal source at a first point of time and a second earlier sub-step of deriving a second digital now-signal corresponding to a signal generated at an earlier second point of time so that an interval of time $\Delta t$ exists between said first point of time and said second point of time when said second earlier step of deriving is performed such that $\Delta t$ is equal to $\frac{1}{4}f$; wherein said step of deriving said digital past signal includes a third sub-step of generating by said signal source a first digital past signal at a third point of time and a fourth sub-step of generating by said signal source a second digital past signal at an earlier fourth point of time prior to said third point of time such that said third point of time precedes said first point of time by M/f, wherein M is an integer, and so that a time interval between said first and second generating steps corresponds to said $\Delta t = \frac{1}{4}f$; and wherein said step of comparing and said step of determining includes the sub-steps of forming a first signal product from said first digital now-signal and said first digital past signal, and forming a second signal product of said second digital now-signal and said second digital past signal, forming a sum of said first and second signal products, forming a third product from said second digital now signal and said first digital past signal, forming a fourth product from said first digital now-signal and said second digital past signal, forming a difference between said third and fourth products, and forming a ratio of said sum and said difference.

6. A method of detecting an abnormality in a single periodic signal generated by a signal source and having a predetermined period, by monitoring the periodic signal, comprising the following steps:
  (a) converting said single periodic signal generated by said signal source from an analog value into a digital signal value;
  (b) storing said digital signal value in a memory;
  (c) deriving a digital now-signal level corresponding to a signal which is provided by said signal source at a first point of time;
  (d) reading out said stored digital signal value as a digital past signal level corresponding to a signal provided by said signal source at a second point of time which is prior to said first point of time by an interval of time equal to an integral number times said predetermined period; and
  (e) comparing said digital now-signal level and said digital past signal level with each other for determining the presence or absence of an abnormality in said single periodic signal generated by said signal source.

7. The method of claim 6, wherein said step of converting comprises the steps of passing said single periodic signal provided by said signal source unchanged to said analog-digital conversion thereof, and wherein said step of converting further comprises also passing said single signal provided by said signal source through a level conversion to said analog-digital conversion.

8. An apparatus for detecting an abnormality in a single signal generated by a signal source, comprising: first means connected to said signal source for deriving a digital now signal corresponding to a signal which is presently provided by said signal source; second means connected to said signal source for deriving a digital past signal itself corresponding to a signal provided by said signal source at a point of time preceding said digital now-signal by a predetermined interval of time; and third means connected to receive from said first and second means said digital now-signal and said digital past signal for comparing the digital now-signal and the digital past signal for determining the presence or absence of an abnormality in said single signal provided by said signal source.

9. The apparatus of claim 8, wherein said signal source produces a periodic signal having a predetermined frequency and period, and wherein said second means for deriving said digital past signal includes memory means for outputting the signal provided by said signal source with a delay interval of time equal to an integral number times said predetermined period.

10. The apparatus of claim 8, wherein said first means for deriving a digital now-signal includes means for deriving a first digital now-signal corresponding to a signal provided by said signal source at a first point of time t1, and further means for deriving a second digital now-signal corresponding to a signal generated at a second earlier point of time in the past such that an interval of time $\Delta t$ exists between said first point of time t1 and said second earlier point of time, whereby $\Delta t$ is equal to $\frac{1}{4}f$ and f is a predetermined frequency of said single signal from said signal source; said second means for deriving a digital past signal including means for generating a first digital past signal corresponding to a signal provided by said signal source at a third point of time preceding by M/f said first point of time t1, M being an integer, and means for generating a second digital past signal corresponding to a signal provided at a fourth point of time preceding by said interval of time $\Delta t$ said third point of time t2; and wherein said third means for comparing and determining includes a first multiplying circuit for forming a first signal product of the first digital now-signal and the first digital past signal, a second multiplying circuit for forming a second signal product of the second digital now-signal and of the second digital past signal, an adding circuit for adding an output of said first multiplying circuit and an output of said second multiplying circuit, a third multiplying circuit for forming a third product of said first digital now-signal and said second digital past signal, a fourth multiplying circuit for forming a fourth product of the second digital now-signal and the first digital past signal, a difference forming circuit for deriving a difference between outputs of said fourth multiplying circuit and said third multiplying circuit, and a dividing circuit for dividing an output of said adding circuit by an output of said difference forming circuit.

11. The apparatus of claim 8, wherein said signal source is a power cable, and said apparatus employs as an operation power source a branch section of said power cable.

12. A method of detecting an abnormality in a single signal generated by a signal source, comprising the following steps:
  (a) deriving an analog now-signal corresponding to a first analog signal level presently generated by said signal source;
  (b) delaying said single signal from said signal source for deriving an analog past signal itself corresponding to a second analog signal level generated by said signal source prior to said now-signal so that a predetermined time interval exists between said analog now-signal and said analog past signal;
  (c) comparing said first analog signal level of said analog now-signal and said second analog signal level of said analog past signal itself with each other; and
  (d) determining the presence or absence of an abnormality in said single signal from said signal source in accordance with a result of said comparing.

13. The method of claim 12, wherein said single signal from said signal source is a periodic signal having a predetermined frequency, and wherein at least one of the levels and one of the phases of the analog now-signal and the analog past-signal are compared with each other in said comparing step.

14. The method of claim 12, wherein said single signal from said signal source is a periodic signal having a predetermined frequency, and wherein said step of deriving an analog past signal includes a step of outputting said analog past signal from a delay device, wherein said analog past signal has been stored for an interval of time equal to an integral number times a predetermined period of said single signal.

15. The method of claim 12, wherein said step of deriving an analog now-signal and said step of deriving an analog past-signal both include the step of passing said single signal unchanged out of said signal source, and a step of converting the signal level of said signal source prior to outputting a level converted signal from said signal source.

16. The method of claim 12, wherein the signal generated by said signal source is a periodic signal having a predetermined frequency f: wherein said step of deriving said analog now-signal includes a first step of deriving a first analog now-signal corresponding to a signal generated by said signal source at a point of time t1 and a second earlier step of deriving a second digital now-signal corresponding to a signal generated at a first earlier point of time so that an interval of time $\Delta t$ exists between the point of time t1 and said second earlier step of deriving such that $\Delta t$ is equal to $\frac{1}{4}f$; wherein said step of deriving said analog past-signal includes a first step of generating by said signal source a first analog past-signal at a point of time t2, and generating by said signal source a second analog past-signal at a second earlier point of time prior to said time t2 such that t2 precedes t1 by M/f, wherein M is an integer, and so that a time interval between said first and second generating steps corresponds to said $\Delta t = \frac{1}{4}f$; and wherein said step of comparing and said step of determining includes the steps of forming a first signal product from said first analog now-signal and said first analog past-signal, and forming a second signal product of said second analog now-signal and said second analog past-signal, forming a sum of said first and second signal products, forming a third product from said second analog now-signal and said first analog past-signal, forming a fourth product from said first analog now-signal and said second analog past-signal, forming a difference between said third and fourth products, and forming a ratio of said sum and said difference.

17. A method of detecting an abnormality in a single periodic analog signal generated by a signal source and having a predetermined period, by monitoring the periodic analog signal, comprising the following steps:
  (a) deriving an analog now-signal level corresponding to said periodic signal from said signal source at a first point of time;
  (b) delaying said periodic analog signal provided by said signal source, by a predetermined time to derive an analog past signal level corresponding to a signal itself generated by said signal source at a second point of time which is prior to said first point of time by an interval of time equal to an integer number times said predetermined period; and
  (c) comparing said analog now-signal level and said analog past signal level with each other for determining the presence or absence of an abnormality in said analog now-signal.

18. The method of claim 17, further comprising passing said single periodic analog signal from said signal source through a first path unchanged to a further processing, and also passing said single periodic analog signal from said signal source through a signal delaying path to said further processing.

19. An apparatus for detecting an abnormality in a single analog signal generated by a signal source, comprising: first means for deriving an analog now-signal corresponding to an analog first now-signal level which is presently provided by said signal source; second means for delaying a signal generated by said signal source for providing an analog second past signal level corresponding to said signal itself provided by said signal source at a point of time preceding said analog now-signal by a predetermined interval of time; and third means for comparing said first analog now-signal level and said second analog past-signal level to determine the presence or absence of an abnormality in said analog signal provided by said signal source.

20. The apparatus of claim 19, wherein said signal source produces a periodic signal having a predetermined frequency and period, and wherein said second means for deriving said analog past-signal includes delay means for outputting the signal provided by said signal source with a delay interval of time equal to an integral number times said predetermined period.

21. The apparatus of claim 19, wherein said first means for deriving an analog now-signal includes means for deriving a first now-signal level corresponding to a signal provided by said signal source at a first point of time t1, and further means for deriving a second analog now-signal level corresponding to a signal generated at a second earlier point of time in the past such that an interval of time $\Delta t$ exists between said first point of time t1 and said second earlier point of time, whereby $\Delta t$ is equal to $\frac{1}{4}f$ and f is a predetermined frequency of said single signal from said signal source; said second means for deriving an analog past signal including means for generating a first analog past signal level corresponding to a signal provided by said signal source at a third point of time preceding by M/f said first point of time t1, M being an integer, and means for generating a second analog past signal corresponding to a signal level provided at a fourth point of time preceding by said interval of time $\Delta t$ said third point of time t2; and wherein said third means for comparing and determining includes a first multiplying circuit for forming a first signal product of the first analog now-signal level and the first analog past-signal level, a second multiplying circuit for forming a second signal product of the second analog now-signal level and of the second analog past signal level, an adding circuit for adding an output of said first multiplying circuit and an output of said second multiplying circuit, a third multiplying circuit for forming a third product of said first analog now-signal level and said second analog past-signal level, a fourth multiplying circuit for forming a fourth product of the second analog now-signal level and the first analog past signal level, a difference forming circuit for deriving a difference between outputs of said fourth multiplying circuit and said third multiplying circuit, and a dividing circuit for dividing an output of said adding circuit by an output of said difference forming circuit.

22. The apparatus of claim 19, wherein said signal source is a power cable, and said apparatus employs an operation power source a branch section of said power cable.

* * * * *

UNITED STATES PATENT AND TRADEMARK OFFICE
CERTIFICATE OF CORRECTION

PATENT NO. : 5,150,111
DATED : September 22, 1992
INVENTOR(S) : Keishi Fujieda, Takeshi Kawamura It is certified that error appears in the above-identified patent and that said Letters Patent is hereby corrected as shown below:

In [57] Abstract: line 9, replace "new" by --now--;
line 11, after "of" insert --time t1--;
line 12, replace "t-1" by --t=1--;
line 13, replace "xm" by --$x'_m$--.

Claim 14, column 15, line 28, replace "driv-" by --deriv---.
Claim 22, column 18, line 9, before "an" insert --as--.

Signed and Sealed this

Fifteenth Day of November, 1994

Attest:

BRUCE LEHMAN

*Attesting Officer*     *Commissioner of Patents and Trademarks*